Jan. 25, 1944.    D. A. SILLERS    2,339,956
COMPENSATED DISPLACEMENT METER
Filed Jan. 19, 1942

DONALD A. SILLERS
INVENTOR.

BY Lester B. Clark

ATTORNEY.

Patented Jan. 25, 1944

2,339,956

UNITED STATES PATENT OFFICE 2,339,956

COMPENSATED DISPLACEMENT METER

Donald A. Sillers, Dallas, Tex.

Application January 19, 1942, Serial No. 427,283

5 Claims. (Cl. 73—281)

This invention relates to fluid meters, and more particularly to the displacement type meter in which means is provided for automatic temperature compensation so that indications by the meter represent the rate of flow or the quantity of fluid when reduced to a standard or a predetermined temperature.

In fluid meters such as are usually utilized in the measurement of gaseous fluids, for example, gas meters, displacement chambers with reciprocating diaphragms are provided and, through suitable valving means, the admission to and exhaust from the receiving chambers is controlled. Such control of the fluid to be measured is utilized to effect movement of mechanisms including a tangent or crank arm to, in turn, impart movement to an indicating or recording mechanism so that the rate of flow or the quantity of fluid passing through the meter in a given length of time is indicated. However, the fluid to be measured expands or contracts with change in temperature at the location of the meter and hence mere volumetric measurement does not accurately indicate the standard volume of the fluid at a given temperature passing through the meter. This is particularly important in meters for measuring gaseous fluids, such as illuminating gas, wherein the volume indicated is too large in hot weather and is too small in cold weather.

The primary object of the invention is to obviate the indicated difficulties in a simple and effective manner.

Another object is to provide a thermostat which controls the effective length of the tangent or crank arm which controls the volumetric displacement resulting from the reciprocating movements of the diaphragms.

Still another object is to provide a construction whereby the variations in the length of the crank arm is effected rectilinearly relative to the center of the crank or valve shaft. Such operation is desirable since any change in lead or lag of the crank arm relative to the shaft results in the change in proof or accuracy of the meter.

Still another object is to provide a device of the class described which is unaffected by change in pressure in the fluid being measured.

The foregoing objects are primary objects and will, together with other objects, be more fully apparent from the following description of the embodiment of the invention considered in connection with the accompanying drawing in which.

Figure 1:
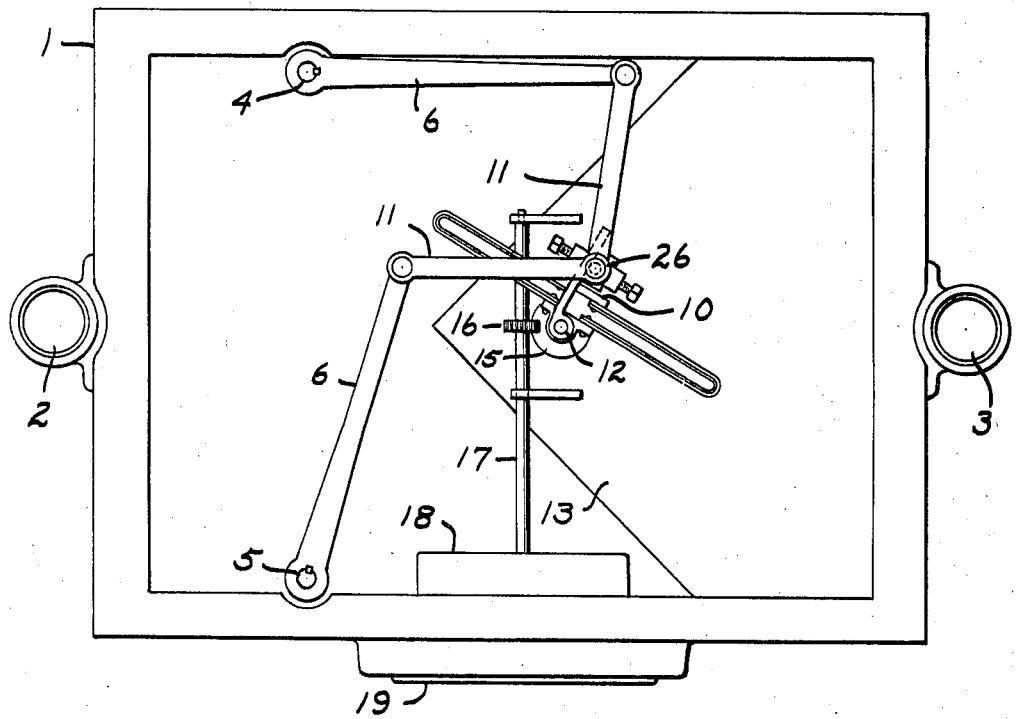
Fig. 1 is a plan view of a meter embodying the invention, the cover of the meter being removed to expose the mechanism embodying the invention.

Referring to the drawing, there is shown at 1 a meter housing provided with openings 2 and 3 so that the meter may be connected in a pipeline in which the flow of fluid is to be measured. The housing 1 encloses displacement chambers for receiving and exhausting quantities of the fluid to be measured, as is well known in the art, and the enclosed displacement mechanism operates to produce partial turning movement of the rods 4 and 5 which extend outwardly from within the displacement chambers, and which control the movements of the diaphragms in the displacement chambers.

The rods 4 and 5 have arms 6 attached to their outer ends and these arms are connected to the crank means, generally identified as 10, by means of links 11 so that the turning movement of the rods 4 and 5 produces rotation of the crank means 10 to rotate the crank or valve shaft 12 which operates the valves beneath the valve cover 13 whereby the action of the displacement mechanism is controlled. The shaft 12 also carries a worm 15 meshing with the worm wheel 16 mounted on the shaft 17 to operate the indicator mechanism 18 which is visible through a window 19 on the exterior of the housing to indicate the rate of flow through the meter or the total quantity of fluid passing therethrough in a given period of time.

The crank assembly 10 is of special construction and comprises (Fig. 2) a collar 25 to which is attached the pivot 26 passing through the inner ends of the links 11. An opening 27 transversely of the collar 25 receives the post 28 fixed upon and extending outwardly from the block 29. The collar 25 is held in fixed axial position upon the post 28 by means of nuts 30 whereby such position may be suitably selected for the particular fluid being measured and also to compensate for the temperature responsive characteristics of the particular thermo-responsive assembly used. These ports 25, 28 and 29 may be termed a crank member.

It is to be noted that the collar 25 is provided with threaded aligned openings in opposite sides thereof to receive cap screws 31 so that the post 28 can be adjusted transversely of the collar.

Attached to the block 29, as by means of rivets 35, and to a similar block or crank member 36 fixed upon the shaft 12, are one or more U-shaped bimetallic thermo-responsive elements 37, which are unaffected by changes in the pressure of the fluid being measured. Each of these elements may comprise an inner and an outer strip of material having different coefficients of thermal expansion and are so constructed as to have the general shape shown in Figs. 1 and 2 when at a given temperature as, for example, 60° Fahrenheit, which is a standard temperature for measurement of gas for domestic consumption. With a metal of higher thermo-expansion on the inner side, the unit tends to expand with increase in temperature and hence move the block 29 to alter the crank length so that proper compensation is effected. The construction just generally described operates satisfactorily where small temperature changes are involved. It is to be noted, however, that expansion and contraction from the positions shown in Figs. 1 and 2 tend to cause the riveted ends of the elements 37 to be subjected to bending action. Such bending action or flexure causes the inherent stiffness of the elements 37 to affect the length of the crank arm. The effect just indicated is of little consequence for small temperature ranges.

In order to provide a device that will operate more satisfactorily for large temperature ranges, I prefer that the thermo-responsive elements 37 shall be compounded at the points 40. That is to say, inwardly from the points 40 the strip of low thermal expansion 41 is placed on the inside of the assembly and the strip of high thermal expansion 42 is placed on the outside.

Figure 4:
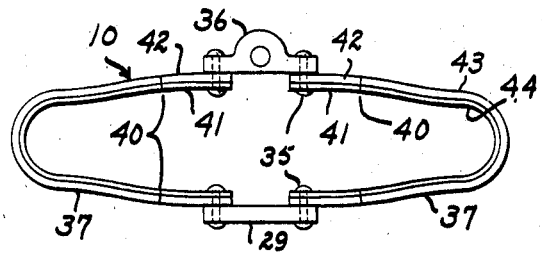
Fig. 4 is a plan view similar to that shown in Fig. 2, but showing the configuration of the thermostatic element when subjected to an elevated temperature.

The outer or U-shaped portion of the elements 37 comprises a strip of low thermal expansion 43 placed on the outside and a strip of high thermal expansion 44 is placed on the inside. The thermo-responsive couples formed in this manner are suitably secured together at points 40, as by soldering or welding to form composite elements which tend to flex in the manner indicated in Fig. 4 of the drawing. This construction has been found to operate efficiently throughout a wide range of temperatures so that the member or collar 25 attached to the pivot pin 26 moves radially of the shaft 12 the desired amount for any given change in temperature.

Torque for the rotation of the shaft 12 may be transmitted through the thermo-expansive assembly 10. This assembly can, however, be relieved of this function by providing the guide member 45 attached to the shaft 12 and extending outwardly therefrom to engage slidably the pivot pin 26 at a point intermediate the collar 25 and the point of attachment of the pivot pin to the arms 11.

Figure 2:
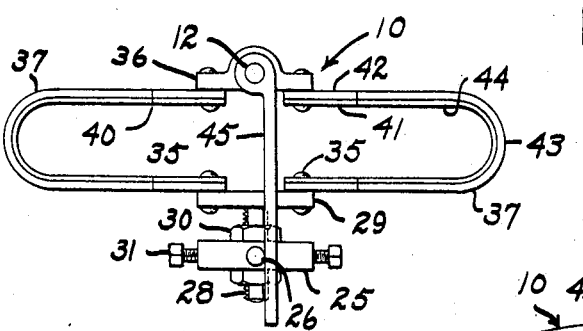
Fig. 2 is a plan view of the thermostatic unit or crank arm comprising an element of the invention.
Figure 3:
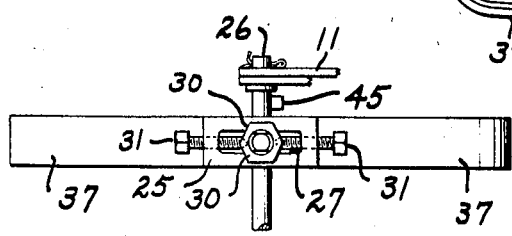
Fig. 3 is an elevational view of the mechanism shown in Fig. 2.

In the operation of the described embodiment of the invention it is assumed that the collar 25 will be properly adjusted axially of the post 28 by means of the nuts 30 and that proper location of the post transversely of the collar will be brought about by adjustment of the cap screws 31 so that the thermo-responsive assembly will have the general shape shown in Figs. 1 and 2 at a given temperature such as 60° Fahrenheit. Passage of fluid through the meter causes the rods 4 and 5 to rock and hence to produce the necessary effort upon the pivot pin 26 and the thermo-responsive assembly 10 to produce rotation of the shaft 12 whereby the indicator mechanism 18 is actuated and the desired control of valves interiorly of the housing 1 will be brought about.

An increase in temperature will result in the increase in the effective length of the crank assembly to control the reciprocating movements of the diaphragms in the displacement meters so that the volumetric displacement in the different chambers of the meter will be increased in proper proportion and also that the indication by the indicator 18 will be corrected for a standard temperature regardless of the actual temperature of the fluid being measured. Attention is directed to the fact that the present device is unaffected by changes in pressure of the fluid being metered, which readily distinguishes it from the Bourdon type of temperature responsive element. It is to be understood, however, that the invention may be utilized on different types of meters without departure from the present invention.

The structure described in general operates when the gas enters through a valve port into the displacement chamber, causing a diaphragm to move, thus enlarging the volume in the displacement chamber. The movement of the diaphragm causes a partial turning movement of the rods 4 and 5, which action transmitted through the links 11, transmitted through the crank arm, comprising the thermostatic strips, operates the valve and also the index. The thermal action on the strips, by changing the effective length of the crank arm, or the distance between part 12 and part 26, does not directly slow down or speed up the index, but does so indirectly, by increasing or decreasing the distance through which the diaphragms move. The index is directly geared to the shaft 12 and the speeding up or slowing up of the meter is accomplished by adjusting the amount of gas displaced by each reciprocating movement of the diaphragms.

Broadly, the invention contemplates a structure which is simple and which effectively obviates temperature errors in the metering of a fluid.

What is claimed is:

1. In a displacement type meter wherein the displacement is controlled by the rotation of a shaft the combination comprising, a pivot movable by displacement mechanism of the meter, a crank assembly including a crank member mounted on said pivot, a second crank member mounted on the shaft, means for adjustably moving one member toward the other member, thermo-responsive means interconnecting said members and operable to move the pivot radially of the shaft to compensate the crank length in accordance with temperature changes, and a drive member on said shaft and slidably engaging the pivot to impart torque from the pivot to the shaft.

2. A thermo-adjustable type crank assembly for displacement meters wherein the length of the crank is to be automatically adjustable as a function of the existent temperature comprising a crank shaft to be turned by the crank assembly, a pivot pin to be moved by the displacement mechanism of the meter, and a crank assembly connecting said shaft and pivot comprising, a support block on the shaft, a support block connected to the pivot, and a pair of bimetallic U-shaped thermo-responsive elements opposed to each other and having one end of each element connected to each of said support blocks, whereby changes in temperature vary the span of the open ends of the U elements to vary the length of the crank assembly.

3. A thermo-adjustable type crank assembly for displacement meters wherein the length of the crank is to be automatically adjustable as a function of the existent temperature comprising a crank shaft to be turned by the crank assembly, a pivot pin to be moved by the displacement mechanism of the meter, and a crank assembly connecting said shaft and pivot comprising, a support block on the shaft, a support block connected to the pivot, and a pair of bimetallic U shaped thermo-responsive elements opposed to each other and having one end of each element connected to each of said support blocks, whereby changes in temperature vary the span of the open ends of the U elements to vary the length of the crank assembly, each of said elements being composed of two compounded strips, each strip being made up of three pieces, one of which is of different thermo-responsive characteristics than the others.

4. A thermo-adjustable type crank assembly for displacement meters wherein the length of the crank is to be automatically adjustable as a function of the existent temperature comprising a crank shaft to be turned by the crank assembly, a pivot pin to be moved by the displacement mechanism of the meter, and a crank assembly connecting said shaft and pivot comprising, a support block on the shaft, a support block connected to the pivot, and a pair of bimetallic U shaped thermo-responsive elements opposed to each other and having one end of each element connected to each of said support blocks, whereby changes in temperature vary the span of the open ends of the U elements to vary the length of the crank assembly, said block connected to the pivot including a post and an adjustable collar thereon.

5. A thermo-adjustable type crank assembly for displacement meters wherein the length of the crank is to be automatically adjustable as a function of the existent temperature comprising a crank shaft to be turned by the crank assembly, a pivot pin to be moved by the displacement mechanism of the meter, and a crank assembly connecting said shaft and pivot comprising, a support block on the shaft, a support block connected to the pivot, a pair of bimetallic U shaped thermo-responsive elements opposed to each other and having one end of each element connected to each of said support blocks, whereby changes in temperature vary the span of the open ends of the U elements to vary the length of the crank assembly, and a guide arm fixed on said shaft and bearing against said pivot.

DONALD A. SILLERS.